May 26, 1959     J. V. FITZGERALD ET AL     2,887,987
CERAMIC BIRD HOUSES

Filed April 11, 1956     2 Sheets-Sheet 1

INVENTORS
JOHN V. FITZGERALD
& ERNEST L. KASTENBEIN

BY *[signature]*
ATTORNEY

May 26, 1959　　J. V. FITZGERALD ET AL　　2,887,987
CERAMIC BIRD HOUSES

Filed April 11, 1956　　2 Sheets-Sheet 2

INVENTORS
JOHN V. FITZGERALD
& ERNEST L. KASTENBEIN
BY
Francis J. Sarke, Jr.
ATTORNEY

United States Patent Office 2,887,987
Patented May 26, 1959

2,887,987

CERAMIC BIRD HOUSES

John V. Fitzgerald, Metuchen, and Ernest L. Kastenbein, Rutherford, N.J.

Application April 11, 1956, Serial No. 577,518

3 Claims. (Cl. 119—23)

The enjoyment and appreciation of song birds prompts increasing numbers of people to provide food sources, nesting materials, and housing facilities for birds on their premises. Studies have been made which show that housing facilities must be suitable in several ways in order to attract birds. In general these requisites are: (1) Bird houses should meet definite specifications as to dimensions, size, and size and position of entrance, ventilation, and drainage. (2) After each brood the old nest should be removed and the bird house cleaned thoroughly. (3) A bird house should be designed for a particular species and meet the requirements of the species for which it was designed.

The present invention relates to bird houses made from heat treated ceramic materials. Bird houses made of heat treated ceramic materials have many advantages over bird houses which are made of wood or other building materials. Ceramic bird houses are durable, fungus and vermin resistant, completely free from rot and generally more sanitary than those made of wood.

In addition, the use of durable glazed colors permits a variety of colorful and novel designs. Use of heat treated ceramics readily permits variation of structure to meet the requirements of different species of birds.

There are a number of basic methods of making articles from heat treated ceramic materials of which the most popular are casting in molds; throwing, turning, or jiggering on a potter's wheel; pressing in a die, and extruding through a die. Although any of the methods referred to above may be employed in the practice of this invention, the method of casting permits a great variety of design and lends itself readily to mass production. In casting, a clay model of the subject is generally made and plaster of Paris is poured over it to form a two-part mold. When the plaster has set the mold is opened and the model removed. After drying, the mold is again assembled and is filled with liquid clay or slip. In order to permit the filling of the mold with the liquid clay or slip it is necessary to have an opening or hole in the mold. If the subject is being hollow cast rather than solid cast, the pour hole in the mold will also appear as a hole in the cast piece.

According to one form of this invention a bird house is made from heat treated ceramic materials wherein the hole used for slip casting the bird house is also used for ventilation of the bird house by providing a novel flange which covers the hole but is arranged to permit ventilation of the bird house through the hole.

The primary object of this invention is to provide bird houses which are sanitary, durable, economical, and attractive.

Another object of this invention is to provide an improved bird house which can be made automatically by slip casting of clays and other ceramic materials.

Other objects of this invention will become apparent after a reading of the following specification and an inspection of the accompanying drawings wherein.

Figures 4 through 10 inclusive are illustrative of various forms of bird houses, the characteristics of which are improved by the employment of the teachings of this invention.

Figure 12:
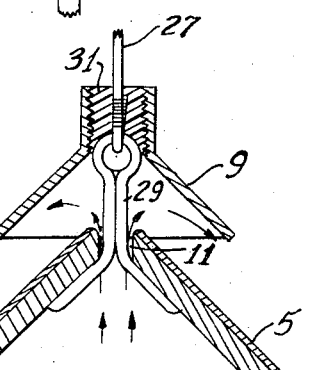
Figure 12:
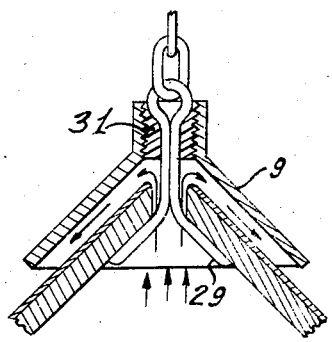
Figure 11:
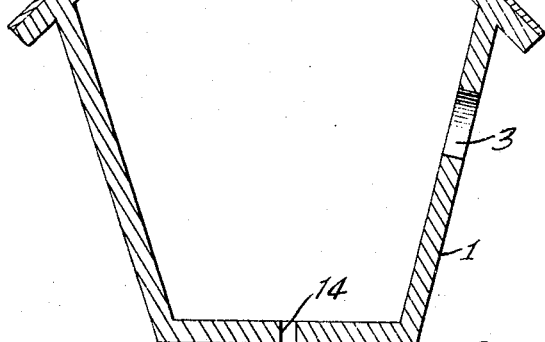

Figures 11 and 12 illustrate in detail various forms of hangers and flanges which may be employed to practice the teachings of this invention.

In each of the figures of the drawing the same numeral designates the same element in its various forms.

In the various figures of the drawing the bird houses shown illustrate some of the various forms that the invention may take. The bird houses are made from heat treated ceramic materials which consist of a body member 1 having side walls and a bottom. An entrance hole 3 is located in the side wall. A roof 5 takes various forms. A hanger 7 is used to hang the bird houses to branches and the like.

A flange 9 is mounted on the hanger 7 and is spaced from the roof 5 but takes the shape and the slope of the roof 5.

An opening or hole 11 in the apex of the roof 5 serves as a casting hole, a ventilating orifice and a means through which the hanger 7 may be secured to the bird house.

A hole 14 may be made in the bottom to provide drainage and additional ventilation.

Figure 1:
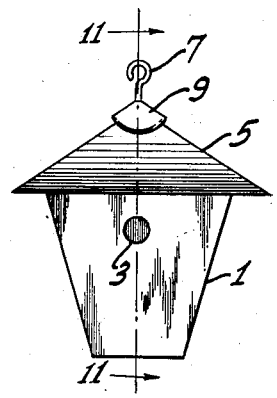
Figure 1 shows a plan view of a bird house made in accordance with the teachings of the present invention.

On Figure 1 the roof 5 extends beyond the body member 1 to provide eaves.

Figure 2:
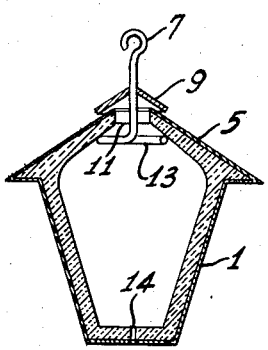
Figure 2 is a sectional view of a bird house made in accordance with the teachings of the present invention.

Figure 2 shows a sectional view of the bird house shown in Figure 1. The spacing between the flange 9 and the roof 5 is clearly shown in Figure 2. The spacing may be obtained by providing nipples or small ridges on the upper surface of the roof 5, or the lower surface of the flange 9. In Figure 2 the opening or hole 11 in the apex of the roof 5 is clearly shown. The hanger 7 is provided with a loop 13 at its bottom in order to secure the hanger 7 to the roof 5. A hole 14 is put in the bottom to provide drainage and additional ventilation. Other forms of hangers and flanges are shown in Figures 11 and 12.

It will be seen by an inspection of Figure 2 of the drawing that the bird house is made of one solid piece. A glaze is shown on the surface of the body member 1 and the roof 5.

Figure 3:
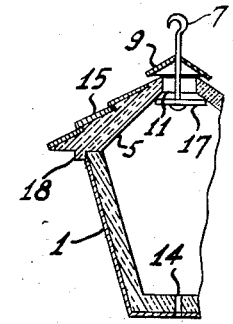
Figure 3 is also a sectional view of another form of bird house made in accordance with this invention.

Turning now to Figure 3 there is shown another form of this invention wherein a shingle pattern 15 is provided on the roof 5 of the bird house. A bar 17 is arranged to sure the hanger 7 under the roof 5. The bar 17 does not cover the hole 11 but permits a circulation of air through the hole 11.

In the form of the invention shown in Figure 3 the body member 1 and roof 5 are placed in the kiln for bisque firing as two separate pieces. The body member 1 and roof 5 are dipped in a glaze suspension, the roof placed in position on the body member 1, and then the combination is glaze-fired in a kiln which gives them the glossy surface of the finished product and also fastens the body member 1 and the roof 5 together with the glazing material at 18.

The remaining figures of the drawing, Figures 4 to 10 inclusive are added to show the various forms which bird houses made in accordance with the teachings of this invention may take.

Figure 4:
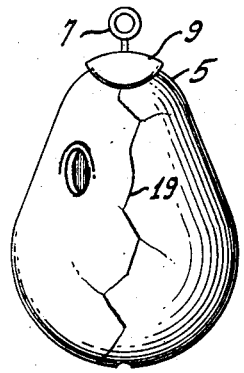

In Figure 4 the flange 9 is curved to conform to the curvature of the roof 5. A crack 19 may be simulated without detracting from the weather resistance which is characteristic of bird houses made in accordance with the teachings of the present invention.

Figure 5:
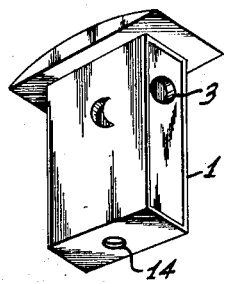

Figure 5 illustrates a bird house which has a cylindrical roof; although not shown the flange would also be cylindrical to conform with the shape of the roof. In Figure 5 the ventilation and drainage hole 14 in the bottom of the bird house is clearly shown.

Figure 6:
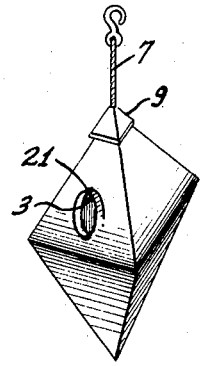

Figure 6 illustrates still another form of bird house made from heat treated ceramic materials. The canopy 21 covering the entrance 3 may be molded into the bird house.

Figure 7:
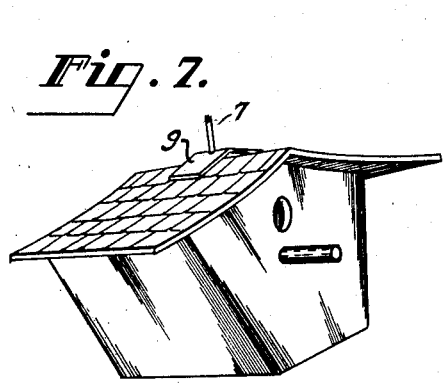

In Figure 7 the popular gabled roof is shown. The flange 9 acts as a rain shield for the ventilation hole as shown in other forms of the invention. An attractive shingled roof may easily be provided in accordance with the teachings of this invention.

Figure 8:
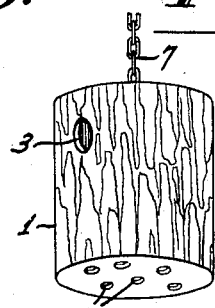

Figure 8 illustrates a bird house made in the shape of a section of log having bark which can be made natural in appearance.

Figure 9:
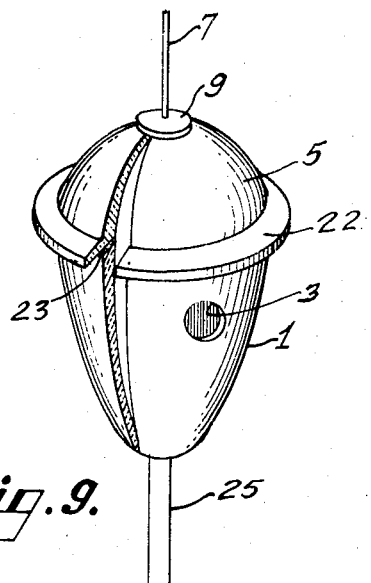

Figure 9 shows a sectional view of a ceramic bird house made in two sections and cemented together with glaze, which is accompanied during gloss firing. If the two halves are separately formed by jiggering, the ventilation, drainage, and entrance holes could be drilled. The roof 5 extends beyond the body member 1 to provide shelter 22 for the entrance hole 3. The roof 5 and the body member 1 may be formed separately and fastened together with cement 23.

A pole 25 may be employed to support the bird house.

Figure 10:
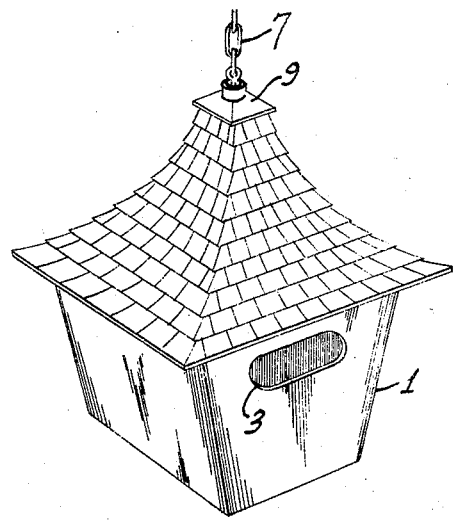

Figure 10 is an ornamental design which can be made in accordance with the teachings of the present invention. An oval entrance hole 3 is suggested to attract wrens.

Turning now to Figure 11 there is shown in detail an arrangement for supporting the bird houses. A hanger 7 made of metal, nylon, or other fabric is secured to a cotter pin 29 which is shaped to hold under the roof 5 through the ventilating hole 11. The hole 11 should be made large enough to provide adequate ventilation. The flange 9 may, for example, take the form of the top of a tube of tooth paste. An epoxy or polyester plug 31 may be employed to seal the hanger 7 to the flange 9.

In Figure 12 the cotter pin 29 is embedded in the plug 31 which screws into the flange 9 to secure it in place.

In the forms of the invention in which the ventilation hole is smaller than the entrance hole the cotter pin 29 or hanger 7 having the form shown in Figure 2 and Figure 3 may be inserted into the bird house through the entrance hole and then threaded through the ventilation hole 11. In still another form of the invention the hangers 7 are of the spring type which expand after being inserted through the ventilation hole 11.

In the forms of the invention shown, either the hole in the apex of the roof 5 or the entrance hole 3 provides access for cleaning by removal of the old nesting material.

Bird houses made from heat treated ceramic materials can be easily sterilized by baking for a few minutes in a kitchen oven or soaking them in an insecticide solution such as DDT.

Although it is not intended to so limit this invention, very attractive bird houses have been constructed in the following manner: Plaster of Paris was turned on a lathe to form a wren house of cylindrical symmetry. The dimensions were chosen so as to allow for shrinkage of the body on casting and firing and also to conform to internal volume and construction recommended by bird house authorities. The pattern was dried and shellacked and a two-piece plaster mold made. Then a slip was cast in the mold to form a hollow one-piece bird house. A one and one-eighth inch entrance hole was cut in the side wall and small drainage and ventilation holes drilled in the bottom. Glaze was then applied. A two-tone effect was achieved by spraying the top or roof in one color and the body member in another color. The bird house was then fired at 1760 degrees Fahrenheit.

Still other satisfactory bird houses were constructed in the following manner. A house of cylindrical symmetry was cast in two pieces. Each piece was pre-fired separately and then glazed and gloss-fired together. The glaze in this case acting as a permanent cementing agent.

The shape of bird houses constructed in accordance with the teachings of the present invention need not be limited to cylindrical symmetry. One of the features of the present invention is that houses of various geometrical shapes can be formed in ceramic and glazed in a wide range of colors. Decorations in colorful relief can be applied. Small utilitarian bird houses of a beauty not heretofore possible can be constructed by mass production techniques. For example, geometrical shapes, elliptical or diamond crystal in form can be produced.

Glazed houses within the scope of this invention can also be produced in non-symmetrical shapes but in novel design.

These ceramic bird houses can have impressions or bas-relief incorporated. Also the basic design can represent small structures of fairy tale lore such as the ginger-bread house of Hansel and Gretel, or castles of medieval times. Such quaint styles as the straw or brick house of the fable of the Three Little Pigs, and other enchanting structures from famous children's stories can be reproduced.

Although bird houses made in accordance with this invention have been illustrated generally as being supported from the top, they may be, if desired, be supported from the bottom on a pole or the like.

Having thus described the invention what is claimed is:

1. A bird house made from ceramic materials comprising: a body member having side walls and a bottom; a roof member having an apex; said side walls, bottom and roof member consisting of a single piece casting, an entrance in its side wall, said roof member having a hole in its apex, a hanger for said bird house, said hanger fastened to said bird house through the hole in said roof member, a flange covering the hole in said roof member but spaced from said roof member to provide ventilation for said bird house, the shape of said flange corresponding to the shape of said roof member to prevent rain from entering the hole in said roof member, and wherein said flange is provided with a cylindrical section at its center and a plug in said cylindrical section, said plug fastened to said hanger.

2. The invention as set forth in claim 1 and wherein said plug is threaded to correspond to threads in said cylindrical section.

3. A bird house made from heat treated ceramic materials comprising a roof with an apex, side wall, bottom, a slip casting hole in the apex of said roof, an entrance hole in said side wall, a hanger for said bird house extending through the slip casting hole in said roof, and a flange covering the hole in the roof, said flange fastened to said hanger and spaced from said roof to provide ventilation for the bird house and wherein said flange is fastened to said hanger by imbedding the hanger in a plug which may be screwed into said flange.

References Cited in the file of this patent

UNITED STATES PATENTS

| | | |
|---|---|---|
| D. 8,427 | White | June 22, 1875 |
| D. 117,053 | Straus | Oct. 10, 1939 |
| 102,573 | Miller | May 3, 1870 |
| 192,557 | Barnum | July 3, 1877 |
| 1,590,982 | Morris | June 29, 1926 |
| 1,894,406 | Lenhart | Jan. 17, 1933 |
| 2,417,178 | Ritter | Mar. 11, 1947 |

FOREIGN PATENTS

| | | |
|---|---|---|
| 506,449 | France | May 29, 1920 |